United States Patent [19]

Diamond et al.

[11] 4,153,262

[45] May 8, 1979

[54] LIFTING EYE AND OVERHEAD GUARD MOUNTING ARRANGEMENT

[75] Inventors: Jack Diamond, Chesterland; Neil J. Shipley, Eastlake; John C. Smith, Mentor, all of Ohio

[73] Assignee: Towmotor Corporation, Mentor, Ohio

[21] Appl. No.: 771,607

[22] Filed: Feb. 24, 1977

[51] Int. Cl.$^{2}$ ........................ B60K 15/00; B60R 21/02

[52] U.S. Cl. .................................... 280/5 A; 414/914; 280/756

[58] Field of Search ........................ 280/756, 5 A, 5 R; 296/102; 214/38 CA, 38 C, DIG. 7; 187/9 R

[56] References Cited

U.S. PATENT DOCUMENTS

| | | | |
|---|---|---|---|
| 2,925,149 | 2/1960 | Hughson | 187/9 R |
| 3,497,090 | 2/1970 | Daniels | 280/756 X |
| 3,721,353 | 3/1973 | Erickson | 214/38 CA |
| 3,790,183 | 2/1974 | Price | 280/5 A |

*Primary Examiner*—John A. Pekar
*Attorney, Agent, or Firm*—Phillips, Moore, Weissenberger, Lempio & Majestic

[57] ABSTRACT

The invention relates to an improvement in a lift truck comprising a first eye structure adjacent a front end of the truck and supported by the truck frame along with a second eye structure adjacent a rear end of the truck and supported by the truck frame. The first and second eye structures are substantially equally spaced from the center of gravity of the truck. An overhead guard structure is supported at a rear end thereof by the second eye structure and at the front end thereof by the truck frame.

8 Claims, 3 Drawing Figures

LIFTING EYE AND OVERHEAD GUARD MOUNTING ARRANGEMENT

BACKGROUND OF THE INVENTION

1. Field of the Invention

The invention relates to lift trucks and more specifically to a structure for lifting a lift truck using a crane or the like and moving it from one position to another and to the use of one particular form of said structure for providing at least a portion of the support for an overhead guard structure of a lift truck.

2. Prior Art

It is known to the prior art to move lift trucks from one position to the other using a crane or the like. For this purpose some lift trucks are provided with tapped holes into which removable eyes can be screwed so that the eyes are then available for attachment to a hook or shackle which is controlled by a crane structure or the like. Problems can occur with galling of the threads of such eyes whereby retapping of such threads becomes necessary. Further, the lift trucks of the prior art do not have the overhead guard structure thereof in any way supported by a lifting eye structure. As a result, a relatively complex arrangement is normally provided whereby the overhead guard structure of a lift truck is mounted completely separately from any lifting structure thereof.

It would be advantageous to provide an improved structure which makes possible the lifting of a lift truck, which structure also serves as at least a partial support for an overhead guard structure of the lift truck. Such an improvement would provide a much simplified overall structure which would feature a minimum number of brackets or the like.

SUMMARY OF THE INVENTION

The present invention is directed to overcoming one or more of the problems as set forth above.

According to the present invention, there is provided an improvement in a lift truck comprising first eye means adjacent a front end of the truck supported by a frame thereof; second eye means adjacent a rear end of the truck supported by the truck frame, the first and second eye means being substantially equally spaced from the center of gravity of the truck; and overhead guard means supported at a rear end thereof by the second eye means and at a front end thereof by the truck frame.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
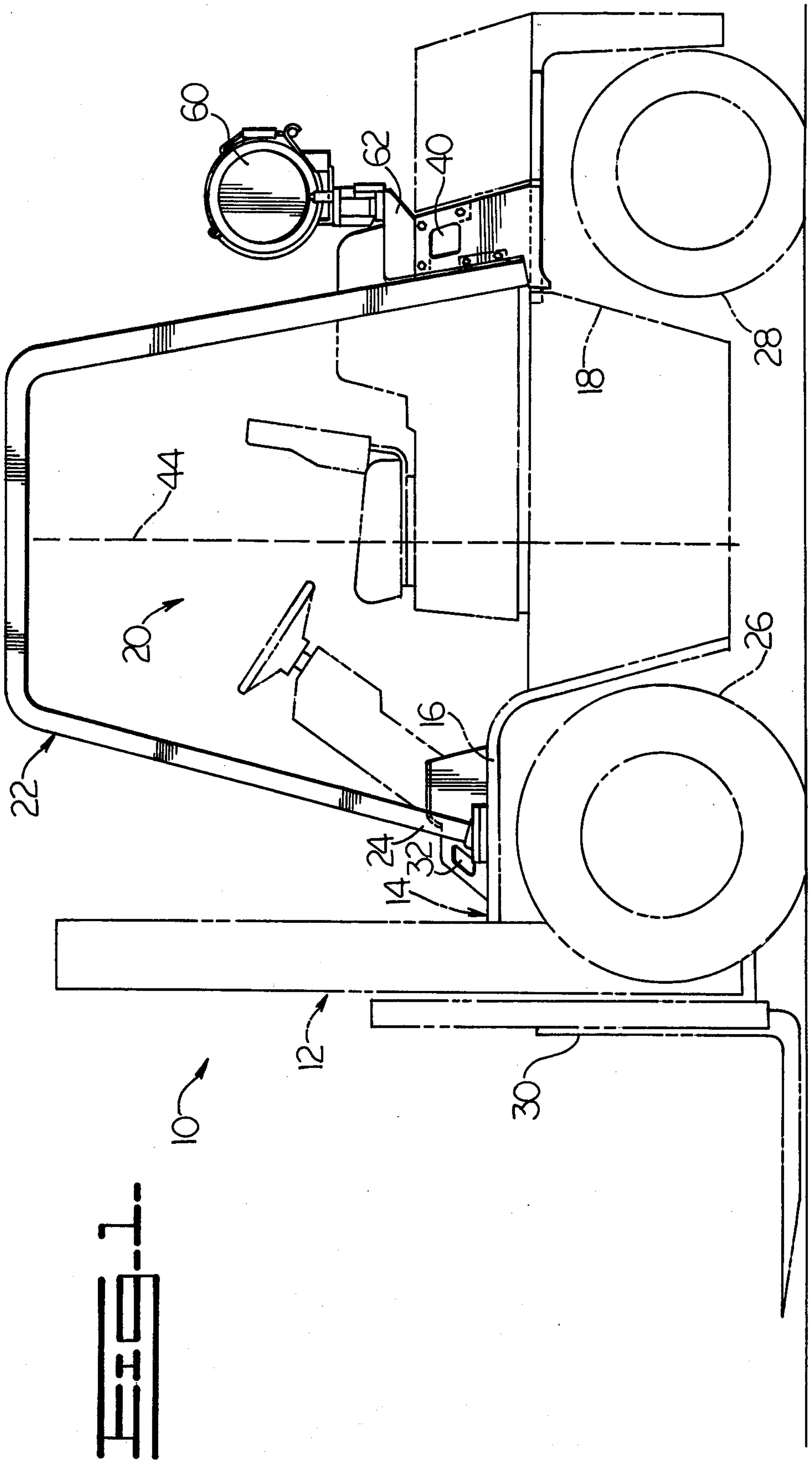
FIG. 1 illustrates a lift truck equipped in accordance with the present invention.

Adverting first to FIG. 1 there is illustrated therein a lift truck 10 of a generally conventional variety. The lift truck 10 includes a mast assembly 12 mounted to a frame 14 which includes fenders 16 and 18 supported thereby as parts thereof. The lift truck 10 includes a cab area 20 protected by an overhead guard structure 22. A front end 24 of the overhead guard structure 22 is supported by the truck frame 14 and more specifically in the particular embodiment illustrated by the front fenders 16. The entire lift truck 10 is movable upon wheels 26 and 28 in a usual manner. Adjacent a front end 30 of the truck 10 there is located first eye means, in the embodiment illustrated a pair of first eyes 32 and 34 seen perhaps most clearly in FIG. 3. The first eyes 32 and 34 are each adjacent one side of the truck 10. In the embodiment illustrated the eye 32 is adjacent a first side 36 of the truck 10 while the eye 34 is adjacent a second side 38 of the truck 10. As will be clear from examination of the figures of the drawings, the eyes 32 and 34 are supported by the frame 14 and more particularly are supported by the fender 16 thereof.

Second eye means, in the embodiment illustrated a pair of second eyes 40 and 42 are provided and attached adjacent a rear end 43 of the truck 10 with the eye 40 being adjacent the side 36 of the truck 10 and the eye 42 being adjacent the side 38 of the truck 10. The pair of first eyes 32 and 34 and the pair of second eyes 40 and 42 are substantially equally spaced from the center of gravity of the truck 10 which is represented in FIG. 1 by a center of gravity line 44.

Figure 2:
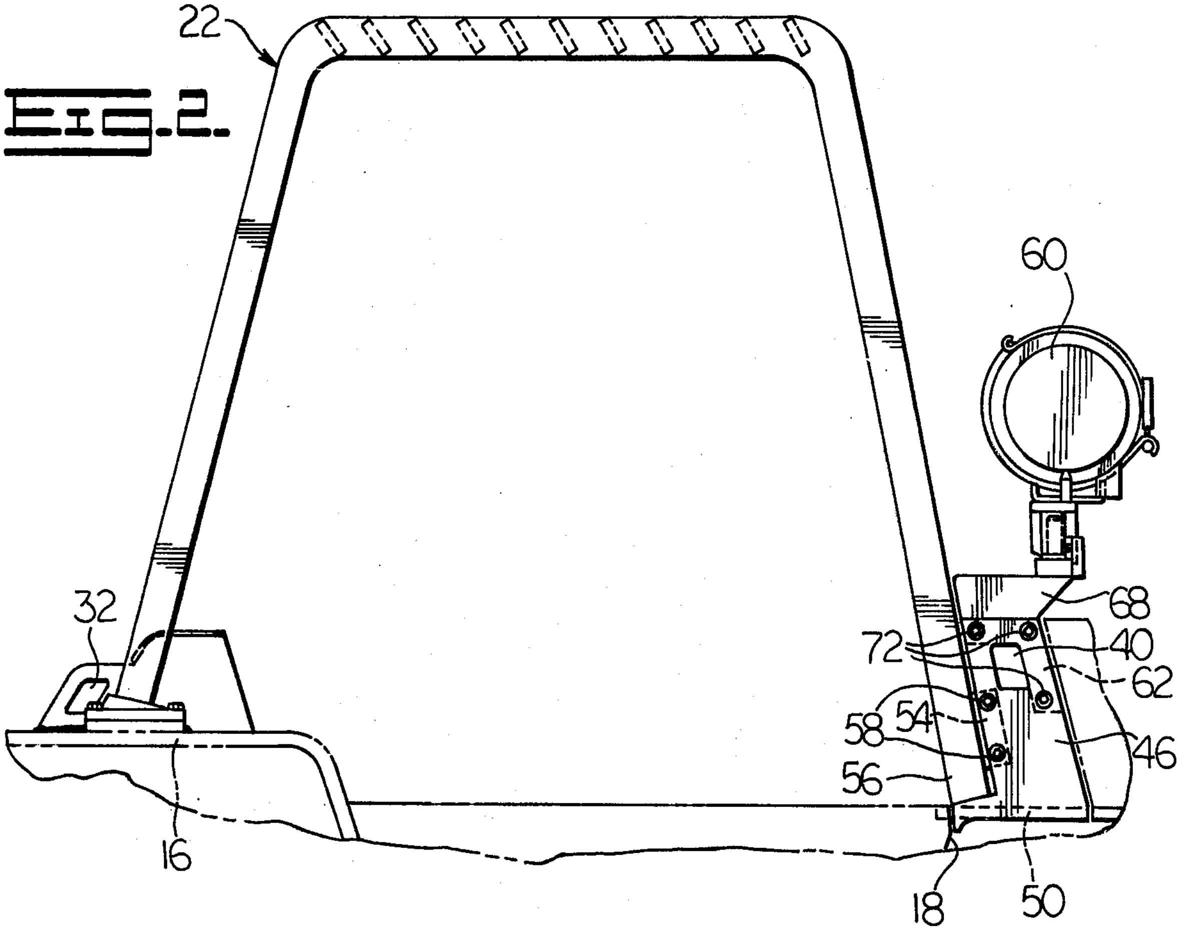
FIG. 2 illustrates in enlarged view the section of the lift truck of FIG. 1 which has been improved in accordance with the present invention.
Figure 3:
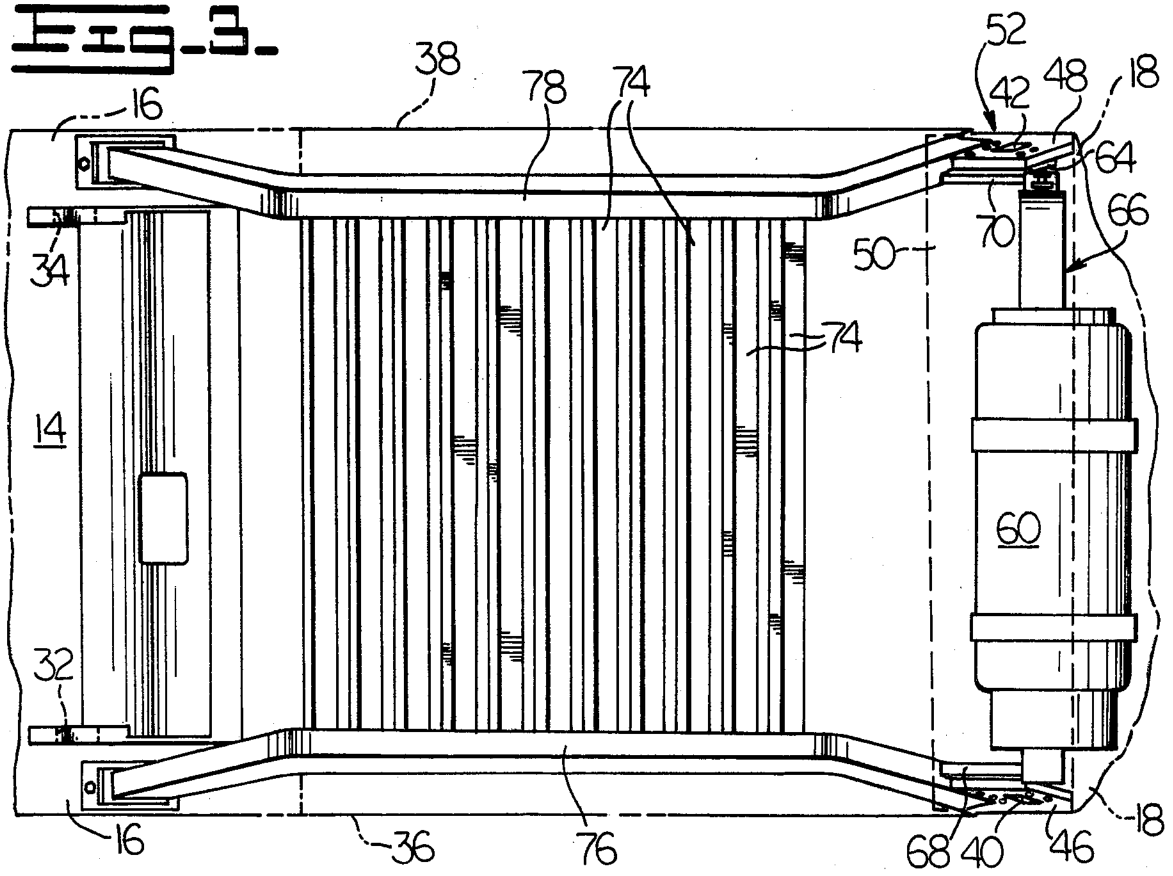
FIG. 3 comprises a top view of the section shown in FIG. 2.

Turning most particularly to the structure of the pair of second eyes 40 and 42 and referring primarily to FIGS. 2 and 3 it will be noted that the pair of second eyes 40 and 42 are each formed in a respective bracket 46 and 48 and the brackets 46 and 48 are connected to one another by beam means, in the embodiment illustrated a structural beam 50 whereby the pair of second eyes 40 and 42 are fastened together to form an integral unit 52.

Referring now primarily to FIG. 2 it will be noted that first tab means, in the embodiment illustrated a pair of first tabs, one of which, 54, is shown in FIG. 2 serve as a support for a rear end 56 of the overhead guard structure 22. It will further be noted that the pair of first tabs extend from the rear end 56 of the overhead guard structure 22 and are fastened to the respective brackets 46 and 48. In the embodiment illustrated in FIG. 2 the tab 54 is shown affixed to the bracket 46 via bolt means 58.

In the preferred embodiment of the present invention an auxiliary fuel tank 60, for example a tank for holding liquified petroleum gas (LPG) or the like is supported by the pair of second eyes 40 and 42. Such support can come about through provisions of a pair of second tabs 62 and 64, one adjacent each side 36 and 38 respectively of the truck 10. The second tabs 62 and 64 respectively in the embodiment illustrated are attached to a support structure 66 for the auxiliary fuel tank 60. The support structure 66 further includes a pair of brackets 68 and 70 respectively which proceeds from the structure 66 and are generally integral with the second tab 62 and 64 respectively. Bolt means 72 serves to fasten the respective second tabs 62 and 64 to the respective brackets 46 and 48 of the respective second eyes 40 and 42. Thus, in the embodiment wherein an auxiliary fuel tank is provided the pair of second eyes 40 and 42 not only provide a support for the rear end 56 of the overhead guard structure 22 but also provide support for the auxiliary tank 60. And, all the above advantages are provided with a simplification in structure of the overall apparatus which makes replacement and servicing of parts easy to accomplish.

It is particularly preferred that the overhead guard structure 22 include a plurality of slats 74 each positioned between a respective one 76 and a respective other 78 of side guard members of the overhead guard structure 22, the slats 74 being positioned at an angle from the horizontal whereby objects are prevented from falling upon the head of an operator sitting within the cab area 20 of the truck 10 yet the operator can look upwardly between the slats 74 for proper observation of the movement of the mast assembly 12 or the like.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a lift truck, an improvement comprising:

first eye means adjacent a front end of said truck supported by a frame thereof;

bracket means adjacent a rear end of said truck supported by said truck frame;

second eye means formed by said bracket means, said first and second eye means being substantially spaced forwardly and rearwardly, respectively, from the center of gravity of said truck; and overhead guard means supported at a rear end thereof by said bracket means and at a front end thereof by said truck frame.

2. An improvement as in claim 1, wherein said first eye means comprise a pair of first eyes, one adjacent each side of said truck.

3. In a lift truck, an improvement comprising:

first eye means adjacent a front end of said truck supported by a frame thereof;

a pair of bracket means adjacent a rear end of said truck supported by said truck frame, one adjacent each side of said truck;

beam means for connecting each of said bracket means to one another to form said pair of bracket means into an integral unit;

second eye means formed by said bracket means, said first and second eye means being substantially spaced from the center of gravity of said truck; and overhead guard means supported at a rear end thereof by said pair of bracket means and at a front end thereof by said truck frame.

4. An improvement as in claim 3, including first tab means serving as a support for said rear end of said guard means, said first tab means extending from said rear end of said guard means and being fastened to said pair of bracket means.

5. An improvement as in claim 3, including:

auxiliary fuel tank means supported by said pair of bracket means.

6. An improvement as in claim 3, including first tab means serving as a support for said rear end of said guard means, said first tab means extending from said rear end of said guard means and being fastened to said pair of bracket means.

7. An improvement as in claim 6, including second tab means serving as a support for said auxiliary fuel tank means, said second tab means extending from said auxiliary fuel tank means and being fastened to said pair of bracket means.

8. An improvement as in claim 7, wherein said overhead guard means includes a pair of side guard members and a plurality of slats positioned from one side guard member to the other with said slats positioned at an angle from the horizontal to allow operator overhead vision while preventing objects from falling from above into a cab area of said truck.

* * * * *